(12) United States Patent
Rabbat et al.

(10) Patent No.: US 10,341,407 B2
(45) Date of Patent: Jul. 2, 2019

(54) MAPPING A LOW QUALITY MEDIA FILE TO A SEGMENT OF A HIGH QUALITY MEDIA FILE

(71) Applicant: Gfycat, Inc., Palo Alto, CA (US)

(72) Inventors: Richard Rabbat, Palo Alto, CA (US); Henry Gan, East Palo Alto, CA (US)

(73) Assignee: Gfycat, Inc., Palo Alto, CA (US)

( * ) Notice: Subject to any disclaimer, the term of this patent is extended or adjusted under 35 U.S.C. 154(b) by 256 days.

(21) Appl. No.: 15/640,204

(22) Filed: Jun. 30, 2017

(65) Prior Publication Data

US 2019/0007476 A1 Jan. 3, 2019

(51) Int. Cl.
*G06F 15/16* (2006.01)
*H04L 29/06* (2006.01)
*H04L 29/08* (2006.01)

(52) U.S. Cl.
CPC ............ *H04L 65/80* (2013.01); *H04L 65/602* (2013.01); *H04L 65/607* (2013.01); *H04L 67/06* (2013.01)

(58) Field of Classification Search
CPC ..... H04L 65/80; H04L 65/602; H04L 65/607; H04L 67/06
USPC .......................................... 709/219
See application file for complete search history.

(56) References Cited

U.S. PATENT DOCUMENTS

| 2007/0170248 | A1* | 7/2007 | Brundage | G06K 19/16 235/380 |
| 2011/0119293 | A1* | 5/2011 | Taylor | G06F 21/10 707/769 |
| 2018/0373925 | A1* | 12/2018 | Wang | G06K 9/00288 |

* cited by examiner

*Primary Examiner* — Alan S Chou

(57) ABSTRACT

In a computer-implemented method for mapping a low quality media file to a segment of a high quality media file, the low quality media file and the high quality media file are received, where the low quality media file corresponds to a segment of the high quality media file. A plurality of perceptual hashes is generated for frames of the low quality media file. A portion of the plurality of perceptual hashes for frames of the low quality media file are compared to perceptual hashes for frames of the high quality media file. A location within the high quality media file that includes the segment corresponding to the low quality media file is determined based on the comparing the portion of the plurality of perceptual hashes for frames of the low quality media file to perceptual hashes for frames of the high quality media file.

20 Claims, 8 Drawing Sheets

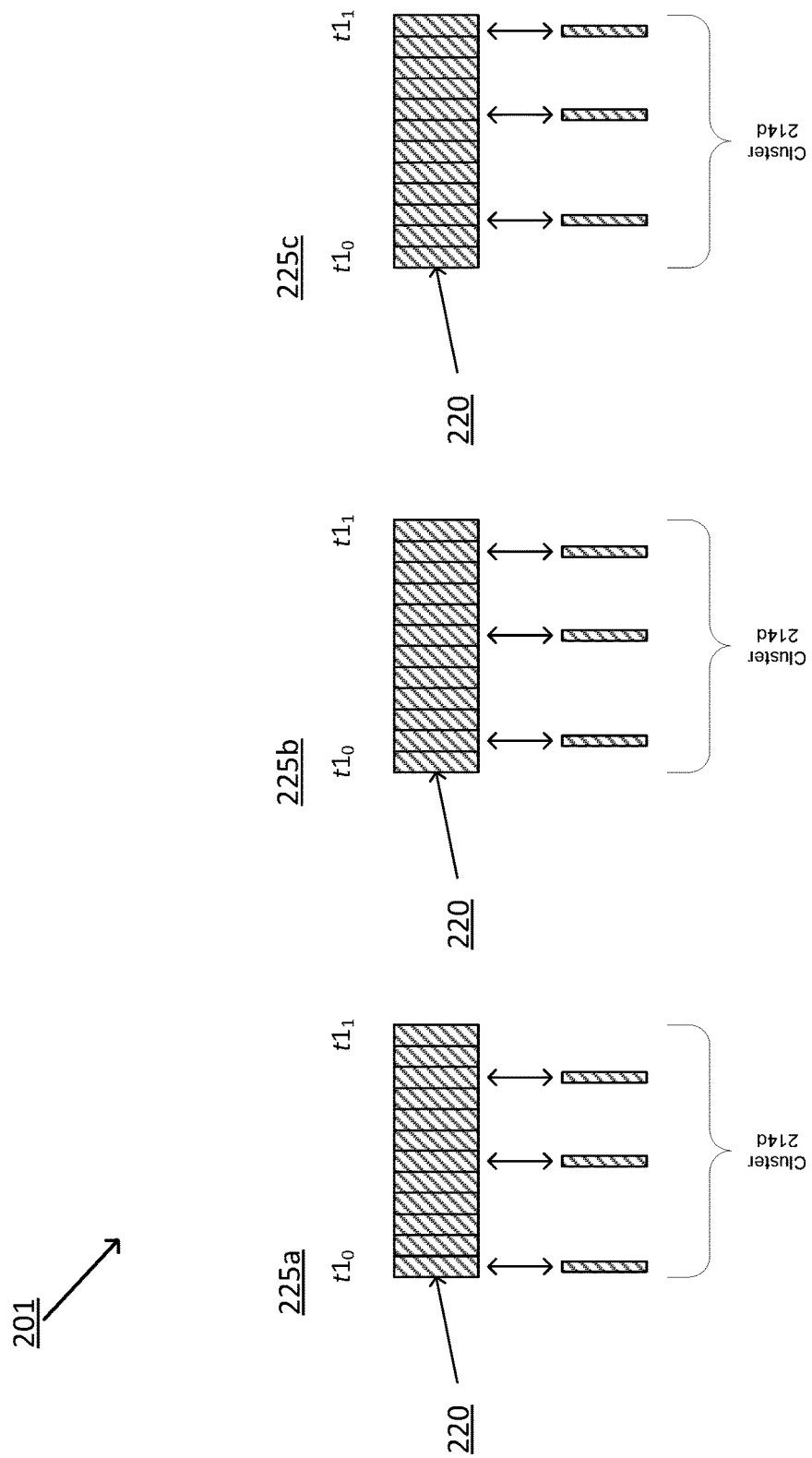

MAPPING A LOW QUALITY MEDIA FILE TO A SEGMENT OF A HIGH QUALITY MEDIA FILE

BACKGROUND

Media files, such as audio and video files, are used in a variety of environments for conveying many types of information. For example, media files can be streamed or otherwise communicated over computer networks, allowing users to view and/or listen to the media content. Media files may be transcoded into different formats, different bitrates, different resolutions, and/or different qualities for a variety of reasons. For example, certain networks or applications may have small file size or low transfer rate limitations. As such, a media file may be of lower quality than desirable (e.g., unclear pixels, poor frame rate, etc.) Various techniques exist for improving or recovering the quality of a poor quality media file. However, in certain circumstances, it is not possible to sufficiently improve the quality of a low quality media file by processing the low quality media file itself.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 2B is a graphical representation of a comparison of a cluster of perceptual hashes of a high quality media file to a perceptual hashes of a low quality media file, according to some embodiments.

DESCRIPTION OF EMBODIMENTS

Figure 1:
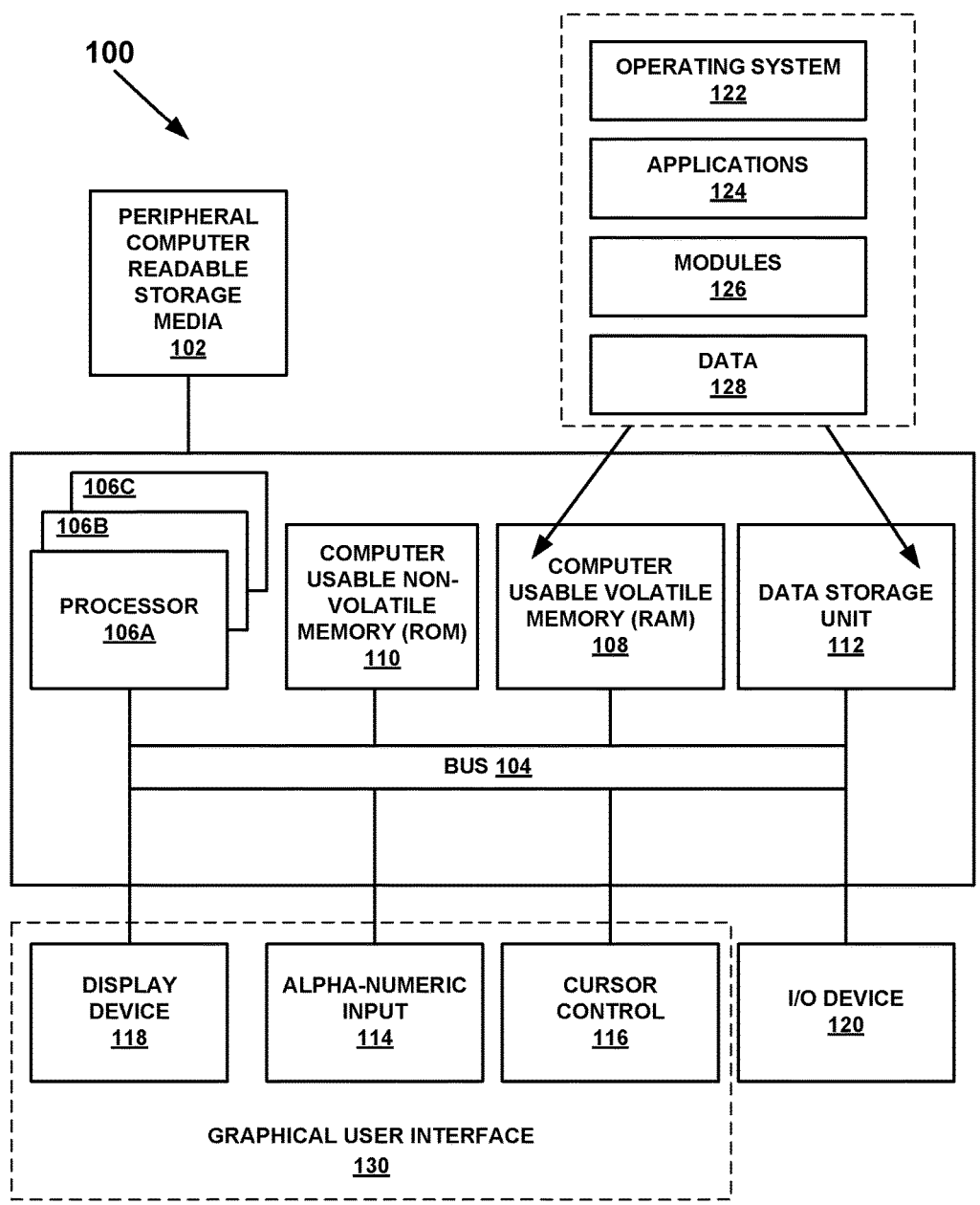
FIG. 1 illustrates an example computer system upon which embodiments described herein be implemented.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "generating," "comparing," "determining," "identifying," "extracting," or the like, refer to the actions and processes of an electronic device such as: a processor, a memory, a computing system, a mobile electronic device, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software.

To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Example representations of mapping a low quality media file to a segment of a high quality media file by comparing perceptual hashes are then described. Example operations of mapping a low quality media file to a segment of a high quality media file are then described.

In accordance with various embodiments, methods for mapping a low quality media file to a segment of a high quality media file are provided. A low quality media file and a high quality media file are received, where the low quality media file corresponds to a segment of the high quality media file. A plurality of perceptual hashes is generated for frames of the low quality media file. In one embodiment, a plurality of perceptual hashes is generated for frames of the high quality media file. A portion of the plurality of perceptual hashes for frames of the low quality media file are compared to perceptual hashes for frames of the high quality media file. A location within the high quality media file that includes the segment corresponding to the low quality media file is determined based on the comparing the portion of the plurality of perceptual hashes for frames of the low quality media file to perceptual hashes for frames of the high quality media file.

Perceptual hashing, as utilized herein, refers to an algorithm or function that is applied to a media file for generating a fingerprint or signature for the media file where the greater the similarity between two media files, the greater the similarity between the perceptual hashes for the two media files. In some embodiments, the output of a perceptual hashing function is a string or sequence, referred to herein as a perceptual hash. For example, two images that are visually similar to a person will have perceptual hashes that are similar, while two images that are visually much different to a person will have perceptual hashes that are less similar. Perceptual hashing can be contrasted with cryptographic hashing where slight variances in the input drastically change the output. Perceptual hashing is useful in determining whether two images are similar. Example perceptual hash functions include phash and dhash, but other types of perceptual hash functions exist and may be utilized herein, in accordance with the described embodiments.

In accordance with various embodiments described herein, similarity between media files, e.g., images or frames of videos, is determined by comparing perceptual hashes for the media files. An edit distance, also referred to herein as a "distance," between the perceptual hashes is determined. As utilized herein, an edit distance refers to a measure of difference between two sequences or strings. For example, edit distance is a measurement of how dissimilar two strings or sequences are to one another by counting the minimum number of operations required to transform one string into the other. Various types distance determinations may be utilized in accordance with the described embodiments, including and without limitation, the Levenshtein distance, the Hamming distance, the Damerau-Levenshtein distance, and the longest common sequence (LCS).

Embodiments described herein pertain to improving the quality of a media file by locating the higher quality version of the media file within a higher quality media file. For example, a low quality media file is a lower quality version of a portion of a high quality media file. While embodiments described herein pertain to video files, it should be appreciated that other types of media files, such as audio files, can be used herein. Moreover, it should be appreciated that any type of media file format can be used in accordance with the described embodiments, including but not limited to Graphics Interchange Format (GIF), MPEG-4 (MP4), Flash video (FLV), Windows Media video, M4V, etc. Moreover, it should be appreciated that the terms "low quality media file" and "high quality media file" refer to the relative quality of the media files when compared to one another. For example, a high quality media file may refer to a high-definition (HD) video file, while a low quality media file would refer to a media file having a resolution less than an HD video file. For purposes of the description of embodiments, it should be appreciated that a low quality media file is of a lower quality (e.g., resolution, color count, low frame rate, etc.) than a corresponding high quality media file.

Embodiments described herein provide methods and systems for mapping a given low quality media file to the corresponding frames of a high quality media file, thus re-creating the low quality media into a high quality version. It should be appreciated that such a high quality media file can be referred to as a source A typical high quality media file includes many frames, each frame representing a snapshot of the high quality media file. Embodiments described herein provide for determining a subset (e.g., segment) of frames of a high quality video file that correspond to the source of the low quality media file.

In some embodiments, key frames are obtained from or identified within the high quality media file. A perceptual hash is generated from the key frames. In some embodiments, clusters of key frames are identified, where a cluster is defined as a valid key frame combination such that the low quality media file can be mapped to the high quality media file with specific timestamps and contain the key frames in the combination. For example, key frames fitting within the duration of the low quality media file are a valid cluster.

In some embodiments, a perceptual hash is generated for every key frame of the high quality media file and every frame of the low quality media file. Each cluster of key frame perceptual hashes is compared with every frame of the low quality media file. For each comparison, an edit distance is determined, for example using the Hamming distance or Levenshtein distance. The lowest possible distance for each cluster is determined, where the other distances for each cluster are disregarded. The lowest possible distance for any cluster is then determined, which identifies a location within the high quality media file that most likely includes the source of the low quality media file. In some embodiments, a padding (e.g., 15 seconds) is added to the first key frame and last key frame of the cluster, creating a clip representing the location for use in identifying a source of the low quality media file within the high quality media file.

Using the clip representing the location within the high quality media file, in some embodiments, a perceptual hash is generated for each frame of the location. In some embodiments, the perceptual hash for the key frames of the cluster previously generated may be reused rather than regenerated. In one embodiment, a perceptual hash is generated for the first frame of the low quality media file. In another embodiment, perceptual hashes are generated for the first frame and last frame of the low quality media file. In other embodiments, perceptual hashes are generated for other frames of the low quality media file.

Perceptual hashes of the high quality media file corresponding to the time position of the perceptual hashes of the low quality media file are compared. For example, where perceptual hashes are generated for the first frame and last frame of the low quality media file, pairs of perceptual hashes of the high quality media file separated by the time duration of the low quality media file are compared to the perceptual hashes for the first frame and last frame of the low quality media file. As the frame rate of the low quality media file and the high quality media file may be different, the time (e.g., measured by time stamps of the frames) multiplied by the frames per second of the high quality media file is used to determine the pairs of perceptual hashes of the high quality media file. For each comparison, an edit distance is determined, for example using the Hamming distance or Levenshtein distance.

The total distance for each perceptual hash comparison is determined for each combination of perceptual hashes of the high quality video file. The minimum distance for each combination represents the frames of the high quality media file corresponding to the low quality media file. For example, where perceptual hashes are generated for the first frame and last frame of the low quality media file, the minimum distance represents the first and last frame of a segment of the high quality media file corresponding to the low quality media file. The segment identified as mapping to the low quality media file is extracted from the high quality media file, thus recreating the low quality media file as a high quality media file.

It should be appreciated that, in accordance with some embodiments, the duration of the low quality media file is not required to be consistent with the matching high quality media file segment. For example, if it is known that the low quality media file is encoded at a different speed than the high quality media file (e.g., the low quality media file is twice the speed of the high quality media file but the contents of the frames are matching), knowledge of the different speed is used to search for the appropriate matching segment in the high quality media file.

Example Computer System

Turning now to the figures, FIG. 1 is a block diagram of an example computer system 100 upon which embodiments of the present invention can be implemented. FIG. 1 illustrates one example of a type of computer system 100 (e.g., a computer system) that can be used in accordance with or to implement various embodiments which are discussed herein.

It is appreciated that computer system 100 of FIG. 1 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1 includes an address/data bus 104 for communicating information, and a processor 106A coupled with bus 104 for processing information and instructions. As depicted in FIG. 1, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 106б, and 106C. Computer system 100 also includes an cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 2A:
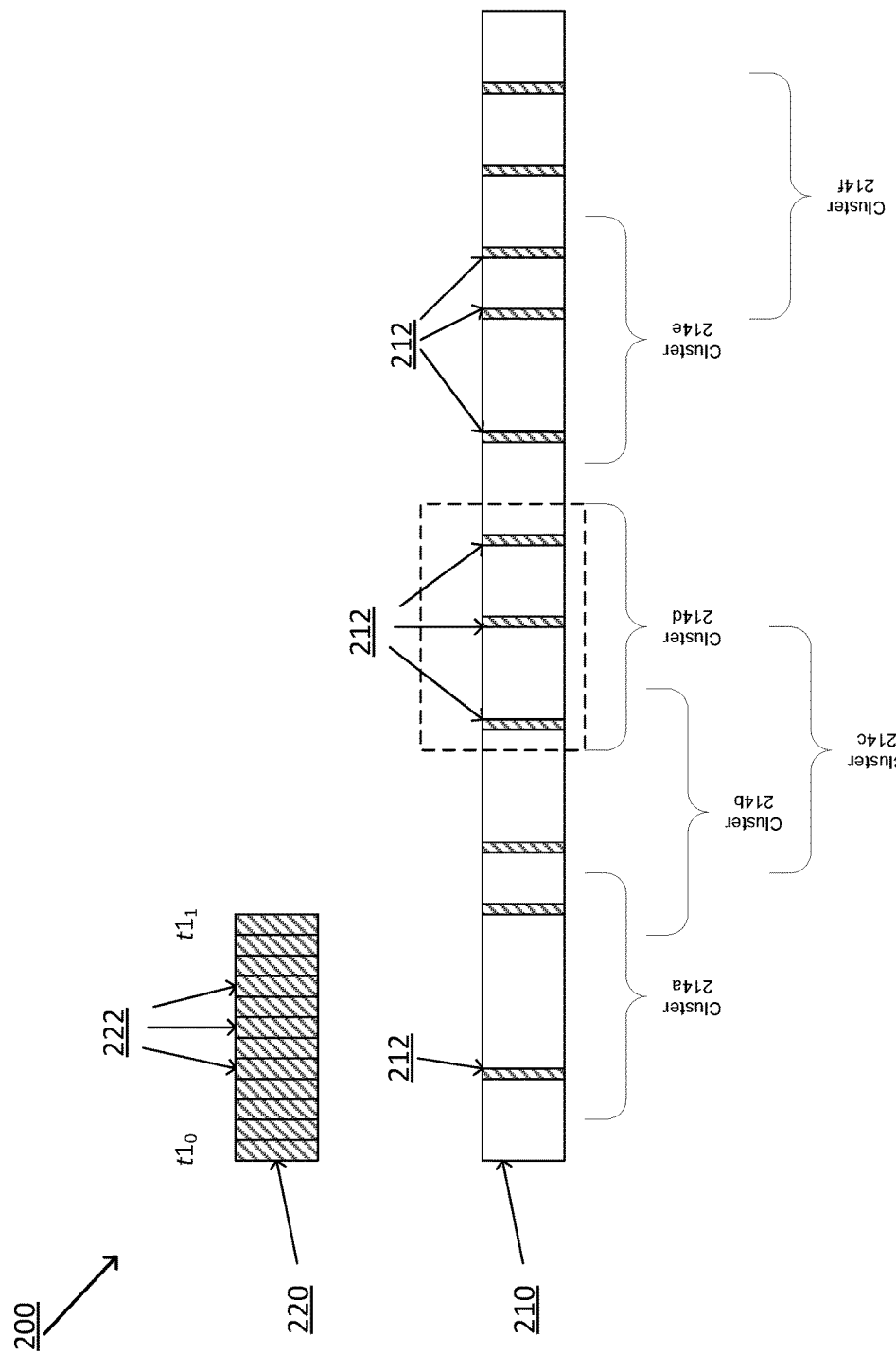
FIG. 2A is a graphical representation of a comparison of perceptual hashes of a high quality media file to a perceptual hashes of a low quality media file, according to some embodiments.

Example Locating a Source of a Low Quality Media File with a High Quality Media File FIG. 2A is a graphical representation 200 of a comparison of perceptual hashes of a high quality media file 210 to a perceptual hashes of a low quality media file 220, according to some embodiments. High quality media file 210 includes frames 212 and low quality media file 220 includes frames 222. It should be appreciated that frames 212 and frames 222 may be encoded at different frames rates. Graphical representation 200 illustrates an example of which frames from high quality media file 210 and low quality media file 220 are for which perceptual hashes are generated. Embodiments described herein identify a segment of high quality media file 210 that corresponds to low quality media file 220 (e.g., is the source of low quality media file 220).

In the illustrated embodiment, perceptual hashes are generated for all of the frames 222 of low quality media file 220 and are and perceptual hashes are generated for a portion of frames (indicated as frames 212) of high quality media file 210. In one embodiment, frames 212 are key frames of high quality media file 210. It should be appreciated that graphical representation 200 is an example indicating which frames 212 and 222 for which perceptual hashes are generated.

In some embodiments, clusters of key frames are identified, where a cluster is defined as a valid key frame combination such that low quality media file 220 can be mapped to high quality media file 210 with specific timestamps and contain the key frames in the combination. For example, key frames fitting within the duration of low quality media file 220 are a valid cluster. Clusters 214a-f represent examples of key frames of high quality media file 210 that fit within the duration of low quality media file 220 (e.g., key frames 212 that are included within the duration $t1_1$-$t1_0$). It should be appreciated that clusters can overlap and include the same frames. For example, the last frame 212 of cluster 214a is also included in cluster 214b.

It should be appreciated that, in accordance with some embodiments, the duration of the low quality media file is not required to be consistent with the matching high quality media file segment. For example, if it is known that the low quality media file is encoded at a different speed than the high quality media file (e.g., the low quality media file is twice the speed of the high quality media file but the contents of the frames are matching), knowledge of the different speed is used to search for the appropriate matching segment in the high quality media file. The difference in speeds can be utilized to determine a speed factor (e.g., speed of low quality media file divided by speed of high quality media file). This speed factor can be used during the comparison to ensure that compared perceptual hashes of the low quality media file and perceptual hashes of the high quality media file are proportionally related. In a particular example, it is known that the low quality media file is twice the speed of the high quality media file. In such an example, key frames fitting within twice the duration of low quality media file 220 are a valid cluster.

As shown in FIG. 2A, frames 212 represent the frames in high quality media file 210 for which perceptual hashes are generated. For example, cluster 214d that includes three frames 212 indicates a valid cluster as the three frames 212 fit within the duration of low quality media file 220. In some embodiments, a list of clusters is generated, wherein each cluster is a list of the key frame positions (e.g., where the frame 212 is located within the high quality media file 210) and its corresponding perceptual hash. For example, each entry in the list of clusters can be another list of key frames and the associated perceptual hashes for the key frames. The list of clusters includes the clusters and an associated minimum edit distance for each comparison of the perceptual hashes.

FIG. 2B is a graphical representation 201 of a comparison of cluster 214d of perceptual hashes of high quality media file 210 file to perceptual hashes of low quality media file 220, according to some embodiments. Perceptual hashes of cluster 214d are compared with valid positions 225a-c in low quality media file. In one embodiment, perceptual hashes of cluster 214d are compared with every valid position in low quality media file.

For each comparison, an edit distance is determined, for example using the Hamming distance or Levenshtein distance. For all compared perceptual hashes, the lowest possible distance for each cluster is then determined, which identifies a location within the high quality media file that most likely includes the source of the low quality media file. Distances for clusters that are not the lowest possible distance are disregarded. Out of all of the clusters, the cluster with the lowest average edit distance is determined to be the closest cluster and thus the low quality media file is likely to be created around that cluster. For purposes of the instant description of embodiments, the region of a high quality media file including the cluster having the lowest average edit distance is referred to as the "location," where the location may include padding on one or both ends of the cluster.

Figure 2C:
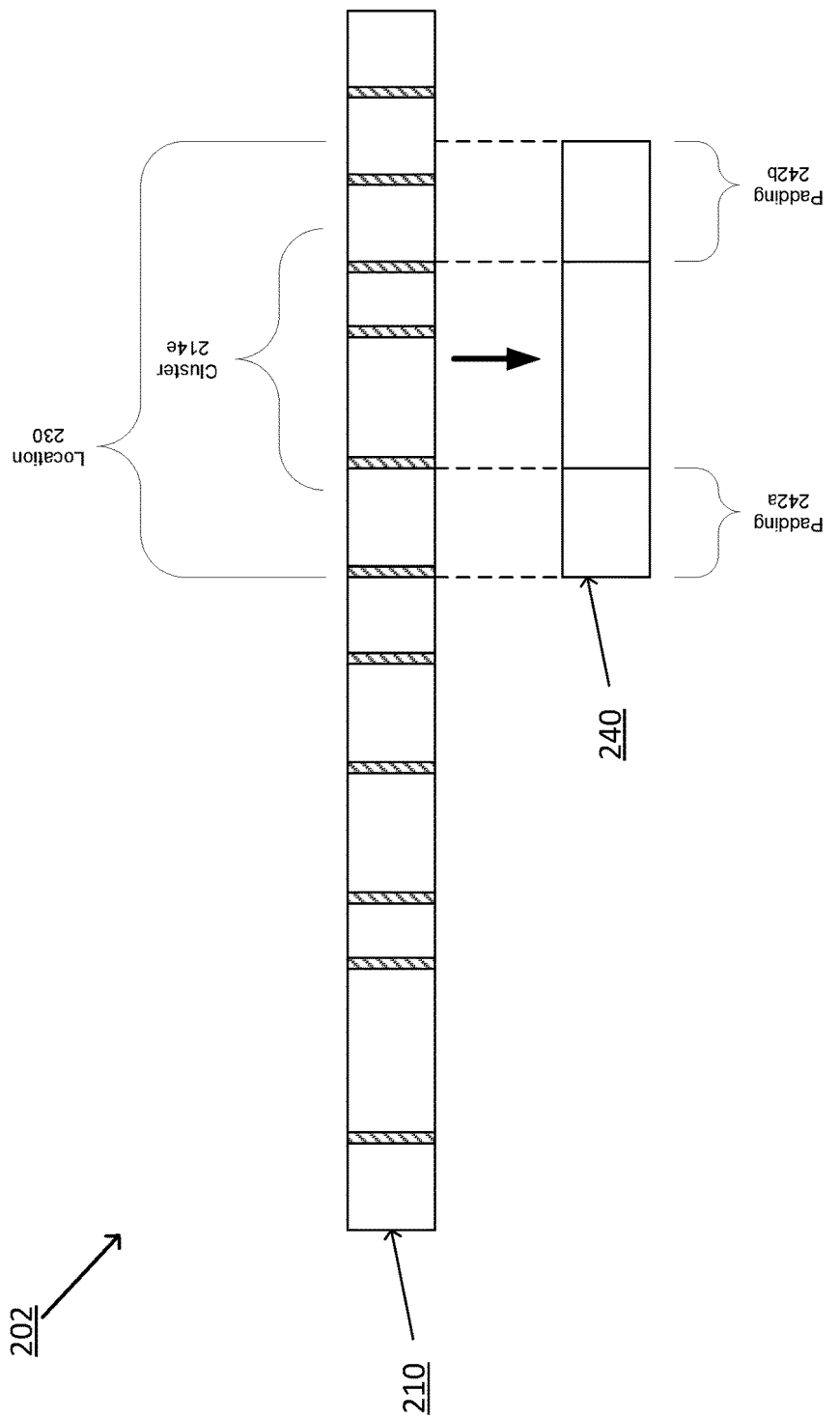
FIG. 2C is a graphical representation of a determination of a location corresponding to a low quality media file within a high quality media file, according to some embodiments.

FIG. 2C is a graphical representation 202 of a determination of a location 230 corresponding to low quality media file 220 within high quality media file 210, according to some embodiments. For purposes of FIG. 2C, it is assumed that cluster 214e of high quality media file is has the lowest average edit distance of all compared clusters. Location 230 includes all frames between the first key frame of cluster 214e and the last key frame of cluster 214e. In some embodiments, padding 242a and 242b (e.g., 15 seconds) is added to the first key frame and last key frame of the cluster, creating a 240 representing the location 230 for use in identifying a source of low quality media file 220 within high quality media file 210. It should be appreciated that the padding can be any length.

Figure 3A:
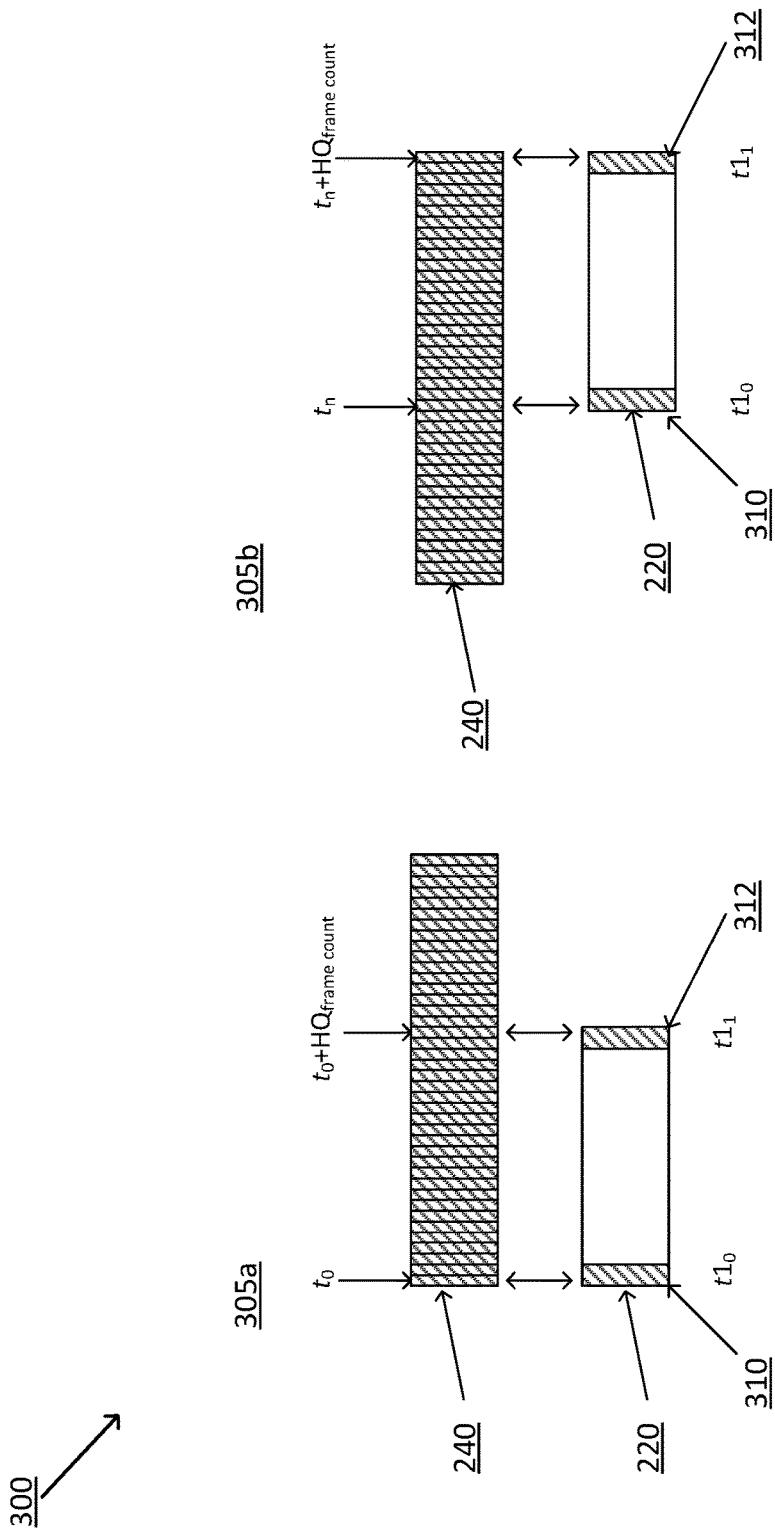
FIG. 3A is a graphical representation of a determination of a segment corresponding to a low quality media file within a location of a high quality media file, according to some embodiments.

FIG. 3A is a graphical representation 300 of a determination of a segment corresponding to low quality media file 220 within a location of high quality media file 210, according to some embodiments.

Using the clip 240 representing location 230 within high quality media file 210, in some embodiments, a perceptual hash is generated for a plurality of frames of clip 240. In one embodiment, a perceptual hash is generated for all frames of clip 240. In some embodiments, the perceptual hash for the key frames of the cluster previously generated may be reused rather than regenerated. In one embodiment, a perceptual hash is generated for the first frame of the low quality media file. In another embodiment, perceptual hashes are generated for the first frame and last frame of the low quality media file. In other embodiments, perceptual hashes are generated for other frames of the low quality media file.

Perceptual hashes of clip 240 corresponding to the time position of the perceptual hashes of low quality media file 220 are compared. For example, where perceptual hashes are generated for first frame 310 and last frame 312 of low quality media file 220, pairs of perceptual hashes of clip 240 separated by the time duration of low quality media file 220 (e.g., $t1_1$-$t1_0$) are compared to the perceptual hashes for the first frame and last frame of the low quality media file. While the illustrated example utilizes perceptual hashes for first frame 310 and last frame 312 of low quality media file 220, it should be appreciated that any combination of perceptual hashes for any frames of low quality media file 220 can be used.

As the frame rate of low quality media file 220 and high quality media file 210 may be different, the time (e.g., measured by time stamps of the frames) multiplied by the frames per second of high quality media file 210 (e.g., $HQ_{fps}$) is used to determine the pairs of perceptual hashes of the high quality media file. The duration of low quality media file 220 multiplied by $HQ_{fps}$ results in the frame count (e.g., $HQ_{framecount}$) of clip 240 separating the frames corresponding to the perceptual hashes being compared to the perceptual hashes for first frame 310 and last frame 312. For example, in comparison 305a, to compare a perceptual hash of the first frame of clip 240 at $t_0$, a perceptual hash for frame 310 at $t1_0$ is compared to a perceptual hash for a frame of clip 240 at $t_0$, and a perceptual hash for frame 312 at $t1_1$ is compared to a perceptual hash for a frame of clip 240 at $t_n$+$HQ_{framecount}$. Similarly, as shown in comparison 305b, to compare a perceptual hash of an nth frame of clip 240 at $t_n$, a perceptual hash for frame 310 at $t1_0$ is compared to a perceptual hash for a frame of clip 240 at $t_n$, and a perceptual hash for frame 312 at $t1_1$ is compared to a perceptual hash for a frame of clip 240 at $t_n$+$HQ_{framecount}$. For each comparison, an edit distance is determined, for example using the Hamming distance or Levenshtein distance.

The total distance for each perceptual hash comparison is determined for each combination of perceptual hashes of clip 240 to perceptual hashes for first frame 310 and last frame 312. The minimum distance for each combination represents the frames of clip 240 corresponding to low quality media file 220. For example, where perceptual hashes are generated for first frame 310 and last frame 312 of low quality media file 220, the minimum distance represents the first and last frame of a segment of high quality media file 210 corresponding to low quality media file 220. The segment identified as mapping to low quality media file 220 is extracted from high quality media file 210, thus recreating low quality media file 220 as a high quality media file.

Figure 3B:
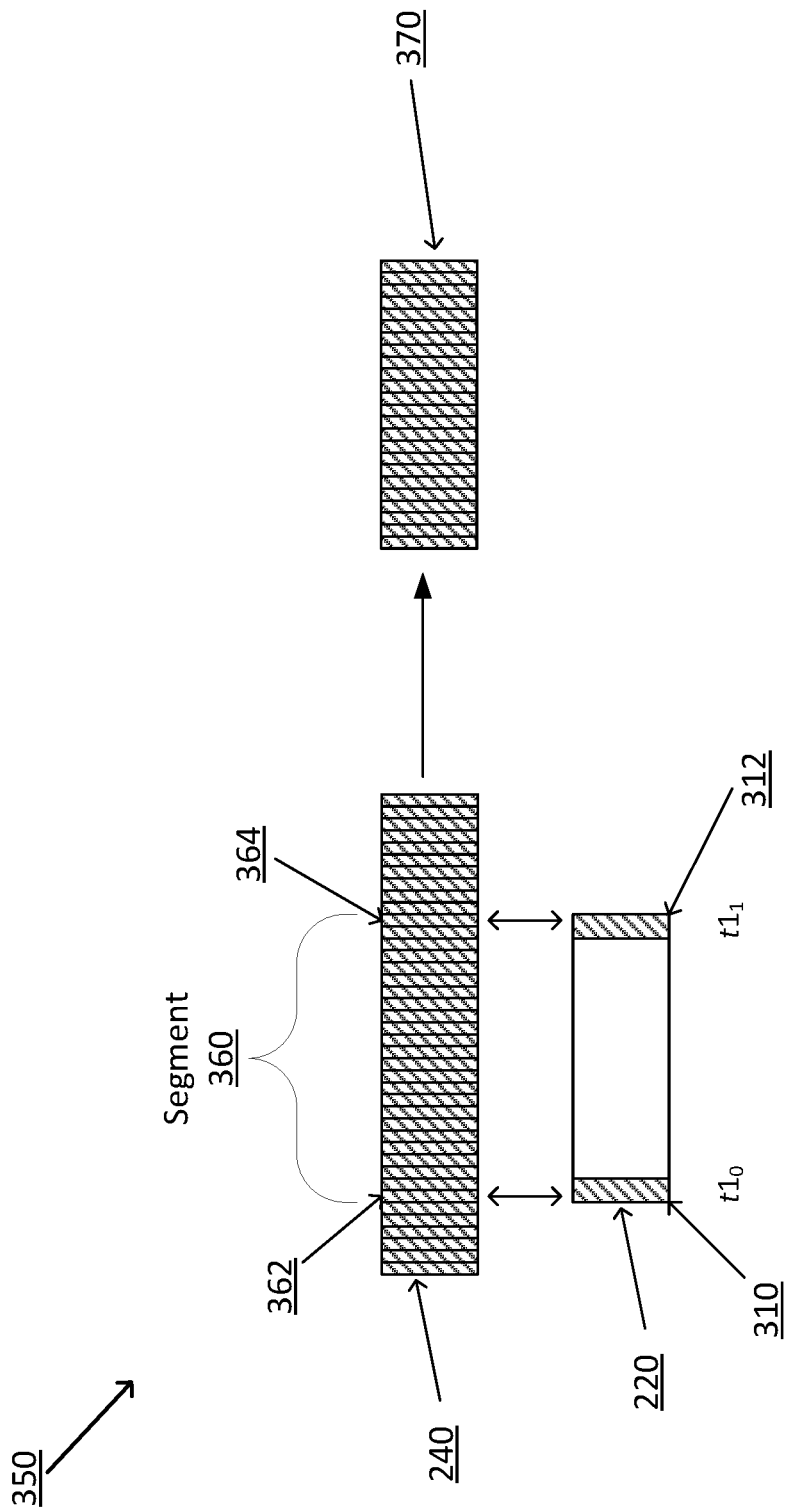
FIG. 3B is a graphical representation of a creation of a new high quality media file that corresponds to a low quality media file, according to some embodiments.

FIG. 3B is a graphical representation 350 of a creation of a new high quality media file 370 of a segment 360 of high quality media file 210 that corresponds to low quality media file 220, according to some embodiments. In the illustrated example, upon completing the comparison of perceptual hashes are generated for first frame 310 and last frame 312 of low quality media file 220 to perceptual hashes of high quality media file 210, it is determined that perceptual hashes for frames 362 and 364 have the minimum distance, and this represent the first and last frame of a segment of high quality media file 210 corresponding to low quality media file 220. Frames 362 and 364 are the first and last frames, respectively, of segment 360.

In one embodiment, segment 360 is extracted from high quality media file 210, thus recreating low quality media file 220 as a high quality media file 370. It should be appreciated that high quality media file 370 can be created in many different ways, such as creating a new media file including exactly the frames of segment 360. Moreover, it should be appreciated that high quality media file 370 can be transcoded into any video format. For instance, if low quality media file 220 and high quality media file 210 were in different formats, high quality media file 370 can be transcoded into the media format of low quality media file 220.

It should be appreciated that, in accordance with some embodiments, the duration of the low quality media file is not required to be consistent with the matching high quality media file segment. For example, if it is known that the low quality media file is encoded at a different speed than the high quality media file (e.g., the low quality media file is twice the speed of the high quality media file but the contents of the frames are matching), knowledge of the different speed is used to search for the appropriate matching segment in the high quality media file. The speed factor can be used during the comparison to ensure that compared perceptual hashes of the low quality media file and perceptual hashes of the high quality media file are proportionally related. If the length of the low quality media file is t seconds and the low quality media is twice the speed of the high quality media file, then the first frame and last frame in the high quality media file are mapped as 2t apart.

Figure 4A:
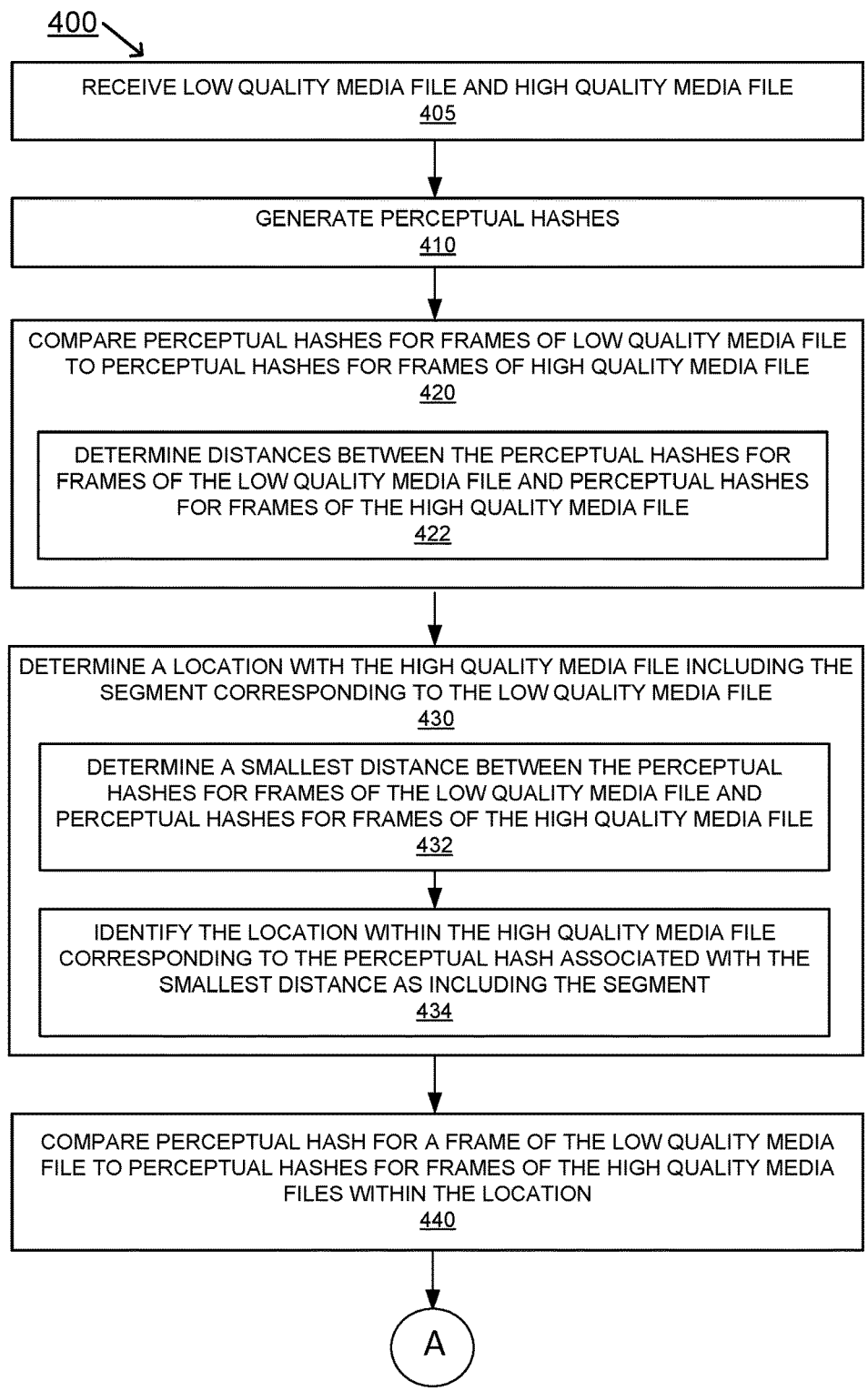
FIGS. 4A and 4B illustrate a flow diagram of an example method for mapping a low quality media file to a segment of a high quality media file, according to various embodiments.
Figure 4B:
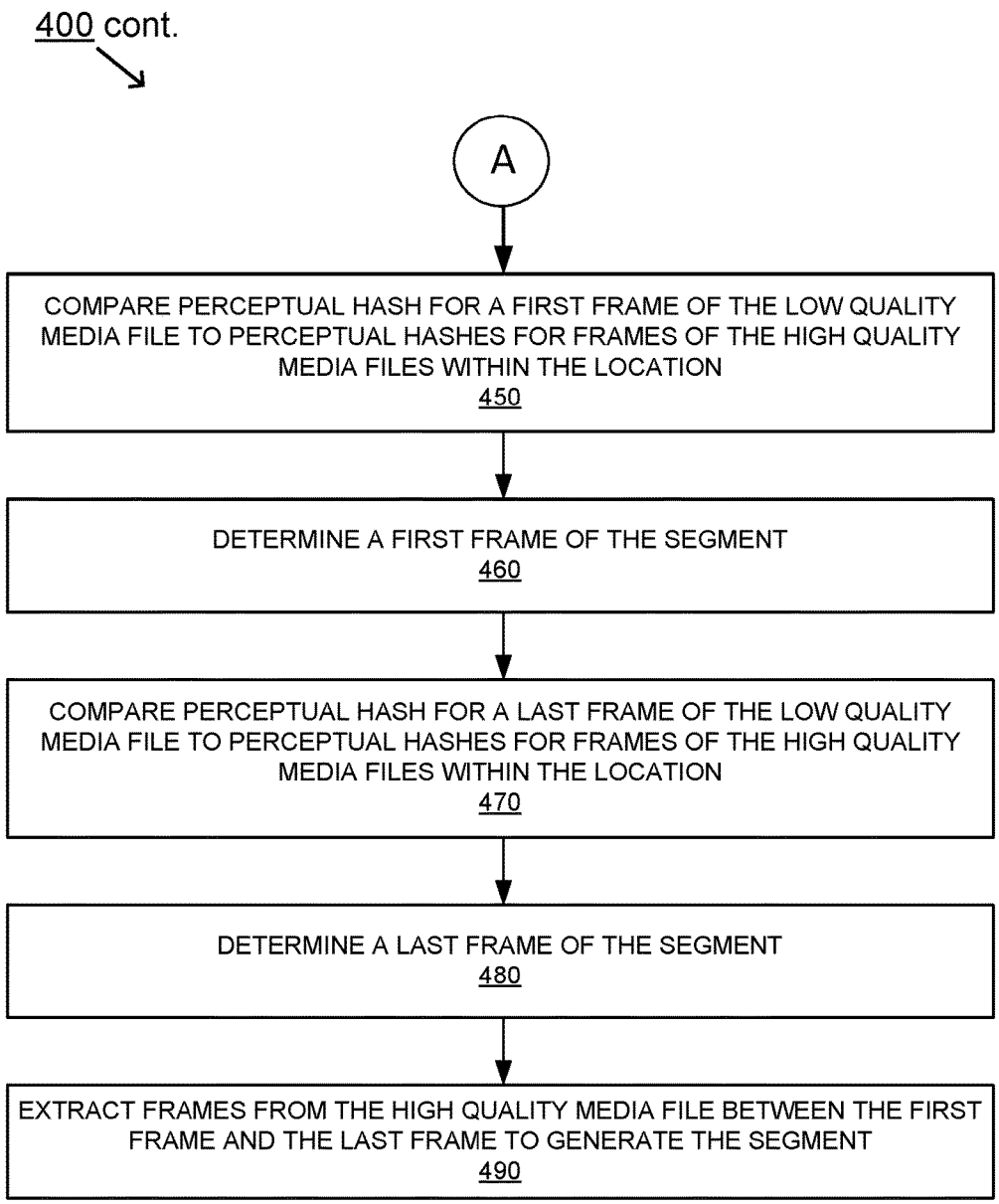

Example Operations of Mapping a Low Quality Media File to a Segment of a High Quality Media File FIGS. 4A and 4B illustrate a flow diagram 400 of an example method for mapping a low quality media file to a segment of a high quality media file, according to various embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 400 includes some procedures that, in various embodiments, are carried out by one or more processors under the control of computer-readable and computer-executable instructions that are stored on non-transitory computer-readable storage media. It is further appreciated that one or more procedures described in flow diagram 400 may be implemented in hardware, or a combination of hardware with firmware and/or software.

At procedure 405, the low quality media file and the high quality media file are received. The low quality media file corresponds to a segment of the high quality media file, and the low quality media file has a duration (e.g., time length).

At procedure 410, perceptual hashes are generated based on the low quality media file and the high quality media file. In one embodiment, a plurality of perceptual hashes for frames of the low quality media file is generated. In one embodiment, a plurality of perceptual hashes for the frames of the high quality media file is generated. In one embodiment, perceptual hashes for key frames of the high quality media file are generated. It should be appreciated that perceptual hashes of the high quality media file may be previously generated and stored for retrieval, such that the perceptual hashes of the high quality media file need not be regenerated.

At procedure 420, a portion of the plurality of perceptual hashes for frames of the low quality media file is compared to perceptual hashes for frames of the high quality media file. In one embodiment, as shown at procedure 422, distances between the plurality of perceptual hashes for frames of the low quality media file and perceptual hashes for frames of the high quality media file are determined. In one embodiment, clusters of the perceptual hashes for the key frames of the high quality media file are compared to the perceptual hashes for frames of the low quality media file corresponding to time locations of the key frames of the high quality media file for the clusters, wherein a cluster comprises key frames of the high quality media file spanning the duration. In one embodiment, distances between the perceptual hashes for frames of the low quality media file and clusters of key frames of the high quality media file are determined.

At procedure 430, a location within the high quality media file that comprises the segment corresponding to the low quality media file is determined based on the comparison of the portion of the plurality of perceptual hashes for frames of the low quality media file to perceptual hashes for frames of the high quality media file. In one embodiment, as shown at procedure 432, a smallest distance between the plurality of perceptual hashes for frames of the low quality media file and perceptual hashes for frames of the high quality media file is determined based on the comparison of the portion of the plurality of perceptual hashes for frames of the low quality media file to perceptual hashes for frames of the high quality media file. In another embodiment, a smallest distance between the perceptual hashes for frames of the low quality media file and clusters of key frames of the high quality media file is determined based on the comparison of the portion of the plurality of perceptual hashes for frames of the low quality media file to perceptual hashes for frames of the high quality media file.

In one embodiment, as shown at procedure 434, the location within the high quality media file corresponding to the perceptual hash associated with the smallest distance as comprising the segment is identified. In another embodiment, the location within the high quality media file corresponding to the perceptual hash associated with the smallest distance as comprising the segment is identified.

In one embodiment, as shown at procedure 440, a perceptual hash for a frame of the low quality media file is compared to perceptual hashes for frames of the high quality media file within the location.

With reference to FIG. 4B, in one embodiment, as shown at procedure 450, a perceptual hash for a frame of the low quality media file is compared to perceptual hashes for frames of the high quality media file within the location. At procedure 460, a first frame of the segment of the high quality media file is determined based on the comparison of the perceptual hash for the first frame of the low quality media file to perceptual hashes for frames of the high quality media file within the location. In one embodiment, the first frame of the segment of the high quality media file is determined as a frame corresponding to a perceptual hash of a frame of the high quality media file having a smallest distance to the perceptual hash for the first frame of the low quality media file.

In one embodiment, as shown at procedure 470, a perceptual hash for a last frame of the low quality media file is compared to perceptual hashes for frames of the high quality media file within the location. In one embodiment, the perceptual hashes for frames of the high quality media file compared to a perceptual hash for the last frame of the low quality media file correspond to frames that are the duration away from the perceptual hashes for frames of the high quality media file that are compared to the perceptual hash for the first frame of the low quality media file. At procedure 480, a last frame of the segment of the high quality media file is determined based on the comparison of the perceptual hash for the last frame of the low quality media file to perceptual hashes for frames of the high quality media file within the location. In one embodiment, the last frame of the segment of the high quality media file is determined as a frame corresponding to a perceptual hash of a frame of the high quality media file having a smallest distance to the perceptual hash for the last frame of the low quality media file.

At procedure 490, frames from the high quality media file from the first frame of the segment to the duration are extracted to generate the segment.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for mapping a low quality media file to a segment of a high quality media file, the method comprising:

receiving the low quality media file and the high quality media file, wherein the low quality media file corresponds to a segment of the high quality media file, the low quality media file having a duration;

generating a plurality of perceptual hashes for frames of the low quality media file;

comparing a portion of the plurality of perceptual hashes for frames of the low quality media file to perceptual hashes for frames of the high quality media file; and determining a location within the high quality media file that comprises the segment corresponding to the low quality media file based on the comparing the portion of the plurality of perceptual hashes for frames of the low quality media file to perceptual hashes for frames of the high quality media file.

2. The method of claim 1, further comprising:

generating a plurality of perceptual hashes for the frames of the high quality media file.

3. The method of claim 1, further comprising:

generating perceptual hashes for key frames of the high quality media file.

4. The method of claim 3, wherein the comparing a portion of the plurality of perceptual hashes for frames of the low quality media file to perceptual hashes for frames of the high quality media file comprises:

comparing clusters of the perceptual hashes for the key frames of the high quality media file to the perceptual hashes for frames of the low quality media file corresponding to time locations of the key frames of the high quality media file for the clusters, wherein a cluster comprises key frames of the high quality media file spanning the duration.

5. The method of claim 4, wherein the comparing a portion of the plurality of perceptual hashes for frames of the low quality media file to perceptual hashes for frames of the high quality media file further comprises:

determining distances between the perceptual hashes for frames of the low quality media file and clusters of key frames of the high quality media file.

6. The method of claim 5, wherein the determining a location within the high quality media file that comprises the segment corresponding to the low quality media file based on the comparing the portion of the plurality of perceptual hashes for frames of the low quality media file to perceptual hashes for frames of the high quality media file comprises:

determining a smallest distance between the perceptual hashes for frames of the low quality media file and clusters of key frames of the high quality media file based on the comparing the portion of the plurality of perceptual hashes for frames of the low quality media file to perceptual hashes for frames of the high quality media file; and identifying the location within the high quality media file corresponding to the perceptual hash associated with the smallest distance as comprising the segment.

7. The method of claim 1, wherein the comparing a portion of the plurality of perceptual hashes for frames of the low quality media file to perceptual hashes for frames of the high quality media file comprises:

determining distances between the plurality of perceptual hashes for frames of the low quality media file and perceptual hashes for frames of the high quality media file.

8. The method of claim 7, wherein the determining a location within the high quality media file that corresponds to the low quality media file based on the comparing the portion of the plurality of perceptual hashes for frames of the low quality media file to perceptual hashes for frames of the high quality media file comprises:
- determining a smallest distance between the plurality of perceptual hashes for frames of the low quality media file and perceptual hashes for frames of the high quality media file based on the comparing the portion of the plurality of perceptual hashes for frames of the low quality media file to perceptual hashes for frames of the high quality media file; and
- identifying the location within the high quality media file corresponding to the perceptual hash associated with the smallest distance as comprising the segment.

9. The method of claim 1, further comprising:
- comparing a perceptual hash for a first frame of the low quality media file to perceptual hashes for frames of the high quality media file within the location; and
- determining a first frame of the segment of the high quality media file based on the comparing the perceptual hash for the first frame of the low quality media file to perceptual hashes for frames of the high quality media file within the location.

10. The method of claim 9, further comprising:
- determining the first frame of the segment of the high quality media file as a frame corresponding to a perceptual hash of a frame of the high quality media file having a smallest distance to the perceptual hash for the first frame of the low quality media file.

11. The method of claim 9, further comprising:
- comparing a perceptual hash for a last frame of the low quality media file to perceptual hashes for frames of the high quality media file within the location, wherein the perceptual hashes for frames of the high quality media file compared to a perceptual hash for the last frame of the low quality media file correspond to frames that are the duration away from the perceptual hashes for frames of the high quality media file that are compared to the perceptual hash for the first frame of the low quality media file.

12. The method of claim 9, further comprising:
- extracting frames from the high quality media file from the first frame of the segment to the duration to generate the segment.

13. A non-transitory computer readable storage medium having computer readable program code stored thereon for causing a computer system to perform a method for mapping a low quality media file to a segment of a high quality media file, the method comprising:
- receiving the low quality media file and the high quality media file, wherein the low quality media file corresponds to a segment of the high quality media file, the low quality media file having a duration;
- generating a plurality of perceptual hashes for frames of the low quality media file;
- comparing clusters of perceptual hashes of key frames of the high quality media file to the perceptual hashes for frames of the low quality media file corresponding to time locations of key frames of the high quality media file for the clusters, wherein a cluster comprises the perceptual hashes for key frames spanning the duration; and
- determining a location within the high quality media file that comprises the segment corresponding to the low quality media file based on the comparing the clusters of the perceptual hashes of the key frames of the high quality media file to the perceptual hashes for frames of the low quality media file corresponding to time locations of the key frames of the high quality media file for the clusters.

14. The non-transitory computer readable storage medium of claim 13, further comprising:
- generating the perceptual hashes for the key frames of the high quality media file.

15. The non-transitory computer readable storage medium of claim 13, wherein the comparing the clusters of the perceptual hashes of the key frames of the high quality media file to the perceptual hashes for frames of the low quality media file corresponding to time locations of the key frames of the high quality media file for the clusters comprises:
- determining distances between the perceptual hashes for frames of the low quality media file and the clusters of the perceptual hashes of the key frames of the high quality media file.

16. The non-transitory computer readable storage medium of claim 15, wherein determining a location within the high quality media file that comprises the segment corresponding to the low quality media file comprises:
- determining a smallest distance between the perceptual hashes for frames of the low quality media file and the clusters of the perceptual hashes of the key frames of the high quality media file; and
- identifying the location within the high quality media file corresponding to the perceptual hash associated with the smallest distance as comprising the segment.

17. The non-transitory computer readable storage medium of claim 13, the method further comprising:
- comparing a perceptual hash for a first frame of the low quality media file to perceptual hashes for frames of the high quality media file within the location; and
- determining a first frame of the segment of the high quality media file as a frame corresponding to a perceptual hash of a frame of the high quality media file having a smallest distance to the perceptual hash for the first frame of the low quality media file.

18. The non-transitory computer readable storage medium of claim 17, the method further comprising:
- comparing a perceptual hash for a last frame of the low quality media file to perceptual hashes for frames of the high quality media file within the location, wherein the perceptual hashes for frames of the high quality media file compared to a perceptual hash for the last frame of the low quality media file correspond to frames that are the duration away from the perceptual hashes for frames of the high quality media file that are compared to the perceptual hash for the first frame of the low quality media file.

19. The non-transitory computer readable storage medium of claim 17, the method further comprising:
- extracting frames from the high quality media file from the first frame of the segment to the duration to generate the segment.

20. A computer system comprising:
- a data storage unit; and
- a processor coupled with the data storage unit, the processor configured to:
  - receive a low quality media file and a high quality media file, wherein the low quality media file corresponds to a segment of the high quality media file, the low quality media file having a duration;
  - generate a plurality of perceptual hashes for frames of the low quality media file;

compare clusters of perceptual hashes of key frames of the high quality media file to the perceptual hashes for frames of the low quality media file corresponding to time locations of key frames of the high quality media file for the clusters by determining distances between the perceptual hashes for frames of the low quality media file and the clusters of the perceptual hashes of the key frames of the high quality media file, wherein a cluster comprises the perceptual hashes for key frames spanning the duration;

determine a location within the high quality media file that comprises the segment corresponding to the low quality media file based on comparing the clusters of the perceptual hashes of the key frames of the high quality media file to the perceptual hashes for frames of the low quality media file corresponding to time locations of the key frames of the high quality media file for the clusters by determining a smallest distance between the perceptual hashes for frames of the low quality media file and the clusters of the perceptual hashes of the key frames of the high quality media file and identifying the location within the high quality media file corresponding to the perceptual hash associated with the smallest distance as comprising the segment;

compare a perceptual hash for a first frame of the low quality media file to perceptual hashes for frames of the high quality media file within the location;

determine a first frame of the segment of the high quality media file as a frame corresponding to a perceptual hash of a frame of the high quality media file having a smallest distance to the perceptual hash for the first frame of the low quality media file; and extract frames from the high quality media file from the first frame of the segment to the duration to generate the segment.

\* \* \* \* \*